United States Patent Office 3,276,853
Patented Oct. 4, 1966

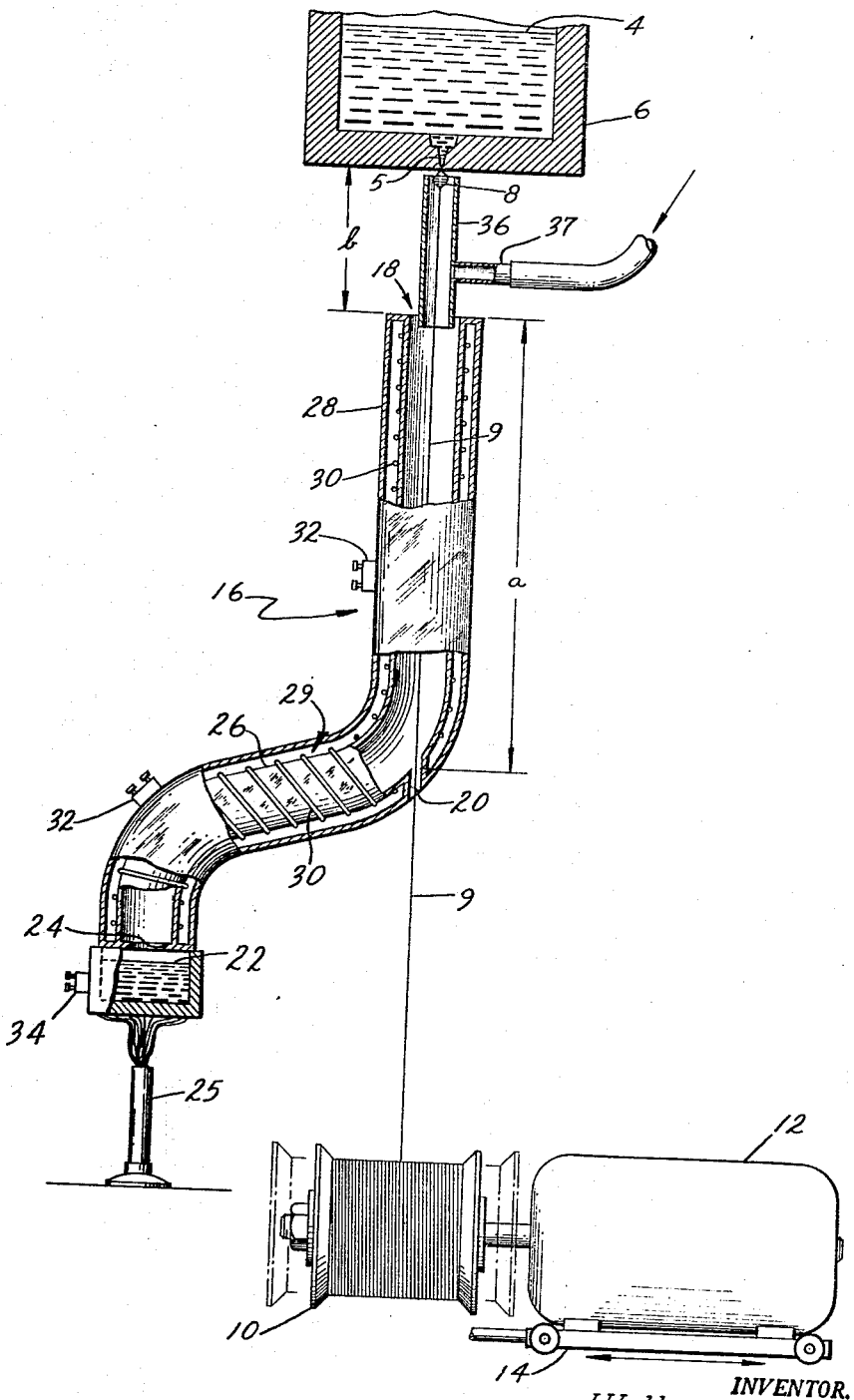

3,276,853
METHOD AND APPARATUS FOR APPLYING GLASS-RESIN COUPLING COMPOSITION TO GLASS
William J. Eakins, Wilbraham, Mass., assignor to De Bell & Richardson, Inc., Hazardville, Conn., a corporation of Connecticut
Filed Aug. 6, 1964, Ser. No. 389,818
2 Claims. (Cl. 65—3)

This application is a continuation-in-part of my earlier filed application Serial No. 177,571, filed March 5, 1962, now abandoned.

This application relates to methods of pretreating fiberglass which is to be used in resin-bonded glass structures, such as laminates, composites and the like.

Fiberglass is manufactured by pulling filaments from a source of molten glass, called a "bushing." As the filaments are formed they are wound on a spool, usually called the "collet." A plurality of individual filaments may be combined to form a strand usually consisting of 204 filaments. A size, such as a starch oil emulsion, may be applied to the glass intermediate the bushing and the collet to improve its handleability. Although the application of a size reduces the likelihood of filament breakage and interfilament adhesion it is generally necessary to remove the size, such as by heat cleaning, before applying a glass-resin coupling composition to the glass.

Conventionally, glass-resin coupling compositions, such as organo-silicon compounds, are applied to the surface of glass filaments in order to provide a serviceable bond between the glass and various synthetic resin mixtures. The coupler compounds are generally applied to the surface of the glass in solvent systems, usually aqueous type using various types of applicators to apply the liquid to the glass.

As it is being formed, a glass filament is so hydrophilic in character that a layer or film of water, called a bonded water layer, quickly forms on the surface of the glass. This water layer is difficult to remove and acts as a barrier which tends to inhibit the attachment of coupling agents to the glass, thereby reducing the number of bonds between the glass and coupler and resulting in diminution of glass-resin bonding strength.

It has been recognized that some of the difficulties incident to the application of coupling agents in aqueous solution are overcome by applying the couplers in a vapor state to molten or nascent glass. The advantage of this approach is intimate bonding between the glass of the coating material. Intimate bonding is obtained because nascent glass is free of water which tends to block reactivity between the coupler and the surface of the glass. Processes and apparatus proposed for applying couplers in the vapor phase include various arrangements whereby the vaporized coupler is applied to the glass fibers as they are formed often resulting in thermal degradation of the coupler. Generally the coupler is applied to nascent glass with the exclusion of air and water vapor from the treatment chamber. While this may be desirable from the standpoint of avoiding a bonded water layer, it has been found, however, that it is equally important to hydrolyze alkoxy silanes because if not hydrolyzed a weak glass-resin bond results particularly in the presence of water. However, silanes containing Si—OH (silanol) groups, created by hydrolysis of one or more alkoxy group, do react with the glass surface or with themselves to liberate one molecule of water for every two reacting silanols. If they react with themselves, they form a linear chain of possibly 2 or 3 units long.

It has been found that silanes can be hydrolyzed as vapors mixed with heated air containing moisture in a matter of a minute or less even though not hydrolyzable for hours or days when mixed in water. In accordance with this invention "moist air" is air containing sufficient moisture to hydrolyze at least one alkoxy group per silane molecule.

It is the principal object of this invention to provide an improved method of manufacturing glass filaments.

It is another object of this invention to provide an improved method of applying glass-resin couplers to glass by which is achieved greater uniformity of surface coverage and incidence of chemical intercoupling or hydrogen bonding of coupler molecules with reactive sites on the surface of the glass.

The above and other objects and advantages of this invention will be more readily apparent from the following description and with reference to the accompanying drawing which is an elevational view showing one type of apparatus for carrying out this invention.

In accordance with this invention a commercially practical method has been found for applying glass-resin couplers to glass filaments during their manufacture. This is accomplished by applying the coupler in its vapor phase to the glass in its nascent or just-formed condition. Vapor phase application in effect provides direct molecular reaction of coupler and glass and avoids the disadvantages of using liquid couplers, particularly aqueous type. It has been found that when a coupler is applied in an aqueous solvent, the water competes with the coupler for glass reactive sites, and indeed it is believed that the water shields the ionic attractive force of the reactive sites. Moreover, the aqueous application does not readily hydrolyze the silane. In addition it is necessary to apply sufficient heat to evaporate the solvent. Furthermore, it has been found any liquid application of couplers at the bushing is not satisfactory since liquids tend to form droplets strongly influenced by gravity and the forces of motion incident to forming and spooling filaments. For example, analysis has shown that the centrifugal force of windup results in concentration of coupler at the periphery portion of a glass lay-up.

One troublesome aspect of vapor phase application to glass is that while some moisture is necessary in order to hydrolyze the coupling agent, if the moisture contacts the glass it will react therewith so as to reduce the number of reactive sites bondable with the coupling agent. I have provided a method and apparatus which overcomes this problem.

Referring now in detail to the drawing, one type of apparatus is shown for carrying out this invention. Molten glass 4 oozes by gravity flow through an orifice 5 in a crucible 6 called the bushing. A globule or "onion" 8 of the molten glass forms at the orifice of the bushing. By attenuation, a filament of glass 9 is pulled downwardly from the "onion" and wound about a roll 10, rotated by a motor 12. Means is provided for reciprocating the roll in order to uniformly wind the filament onto the roll with minimum contact to avoid breakage or damage to the extremely friable filament. As shown, the motor 12 is mounted on a carriage 14 which may be reciprocated by any suitable means, such for example as shown in my copending application Serial No. 51,565, filed August 24, 1960.

In accordance with this invention, a glass-resin coupling agent is applied in its vaporous state to the filament 9 during or immediately subsequent to its formation. Application of the coupling agent is carried out by providing a vapor chamber, shown generally at 16 through which the filament is led. The chamber is located intermediate the bushing 6 and the windup roll 10 below the bushing orifice. The chamber may have an opening 18 to the atmosphere at its upper end and an opening 20 to the atmosphere directly below the opening 18 for passage of the filament out of the chamber. The vapor of coupler 22 rises in chamber 16 from the bottom and exhausts through opening 18 at the top. This updraft of coupling vapor draws air into the chamber through opening 20. The air, of course, contains water vapor. There is thus an intermingling of coupling agent vapor and moist air. Each mole of coupler reacts with at least one mole of water in the air to become hydrolyzed. Under normal condition sufficient moisture is present in the air to supply the water required to so hydrolyze the coupler avoiding, of course, any steps which would render the treatment chamber anhydrous.

The distance $a$ from the top of the chamber to the opening 20 is selected to provide sufficient contact time of the glass filament and the coupler vapor so that an adequate number of glass reactive sites will be occupied by coupler molecules to obtain requisite resin-glass bonding.

A glass coupler, such as shown at 22, is introduced in its vapor phase into the lower end of the chamber 16 through an opening 24. The coupler is vaporized in any suitable manner, such as shown in the drawing, in which the coupler 24 in liquid form is heated by heat source 25 sufficiently to provide an adequate supply of vapor in the chamber 16. The alkoxy silanes may be heated to a temperature of between 212° F. and 325° F., much less than their boiling points. The coupler vapor rises from the bottom to the top of the chamber providing a rising stream of vapor through which the filament is drawn. It is important that the coupler be introduced into chamber 16 at a lower level than opening 20 to avoid a reaction of the moist air with the surface of the coupling agent causing the coupler to gel.

An important aspect of this invention is that a coupler in its vaporous condition is characterized by minimum intermolecular attraction and maximum molecular activity in contrast to liquids which are characterized by lower molecular activity and surface tension whereby they tend to form drops which as mentioned above are affected by gravity and filament velocity.

Another equally important consideration in carrying out this invention is that the glass filament be in its nascent condition, as it is drawn through the hydrolyzed coupler vapor. In its nascent condition a glass filament is substantially devoid of a bonded water layer which normally forms on the hydrophilic glass, acting as a barrier to subsequent attachment of coupling agents to the glass. Nascent glass is substantially moisture free and its negatively charged reactive sites exert an attractive force on the molecules of the coupler which increases the probability of free moving vapor molecules reacting therewith. In effect, the method embodying this invention achieves direct molecular application of the coupler to the glass eliminating the problems incident to liquid application of coupler to glass. In this way a minimum quantity of coupler is applied while achieving maximum effectiveness. This is important because it is believed that the wet strength of glass-resin structures is inversely related to the thickness of the coupler interface. Furthermore, vapor application obviates the necessity of touching the friable filament and thus minimizes problems of filament breakage.

The coupler vapor chamber may be made of any suitable material and be of any suitable configuration. In the embodiment shown, the chamber is in the form of a glass tube 26 disposed coaxially within another glass tube 28. The tubes are sealed together at their upper and lower ends forming a dead air space 29 between the tubes providing temperature insulation of the inner tube.

Means is provided for controlling the temperature of the inner wall of tube 26 at a generally constant value which is approximately equal to the vaporization temperature of the coupling agent being applied to the glass. As shown, the temperature control means comprises electrical resistance heating wires, such as shown at 30, wound helically about the inner tube 26. A plurality of thermocouples 32 are disposed in longitudinally spaced relation along the chamber 16 to sense the temperature of the inner tube 26 at spaced locations along its length. The thermocouples are electrically connected to the resistance wires and to a thermocouple 34 which monitors and controls the vaporization of the coupler. The thermocouples 32 are operated in conjunction with thermocouple 34 for maintaining the inner wall of the tube 26 at or slightly below the temperature required to vaporize the coupling agent and insure against condensation of coupler or water vapor on the inner wall of the tube 26. At the elevated temperature maintained within chamber 16 the coupler hydrolyzes readily and reacts with the nascent glass.

The vapor chamber 16 is disposed relative to the orifice of the bushing so that the filament 9 will pass through the vaporized and hydrolyzed coupler while the glass is in its nascent state. For the purposes of this invention nascent refers to the transitory state of glass as it is formed from its molten condition and before a water layer has formed on the surface of the glass. Since water shields the surface electro-negativity of the glass reactive sites and forms a bonded, difficult-to-remove, barrier to the proper application of glass-resin couplers, it is important that the glass be nascent when in contact with the coupler vapor.

The vaporized couplers should be applied close to the bushing while taking into consideration the fact that the filament must be allowed to cool to a temperature which will not cause heat degradation of the coupler. Cooling is accomplished by spacing the vapor chamber from the bushing and providing an anhydrous and inert zone from the bushing to the chamber. Generally, however, with glass filaments being formed at the commercial forming rate of 10,000 to 14,000 feet per minute, the coupler may be applied within approximately 6 feet of the bushing orifice. It has been found that good results are obtained when the glass is allowed to cool to a temperature of less than 600° F. and preferably in the range 300–350° F. before entering the vapor-treatment chamber 16.

In the embodiment shown, the upper end of the vapor chamber 16 is located a short distance $b$ below the orifice 5 to provide cooling time for the strand in order to avoid heat degradation of the coupler. An open tube 36 extends from below the orifice 5 downwardly into the upper opening 18 of the chamber 16. A dry, chemically inert gas is introduced into the tube 36 by means of the conduit 37. The gas may be any suitable moisture free, chemically inert gas, such as dry air, low dew point nitrogen or the like. The tube 36 thus provides an anhydrous forming chamber in which the glass is cooled. Certain couplers which are capable of withstanding higher temperatures, such as vinyl triethoxy silane, may be applied at the bushing without provision for a cooling distance $b$. In this case the upper end of the chamber may be located closer to the orifice 5.

The contact time of the glass filament with the coupler vapor in the chamber 16 should be sufficient to provide for adequate intercoupling of the vapor and glass molecules. The requisite contact time may be obtained in a given apparatus as a function of the length of the chamber through which the filament is led, shown as $a$ in the drawing, and the speed of advance of the filament through the chamber and may also be influenced by the type of coupler and glass.

After the coupling vapor is formed it rises in the chamber 16 and draws moisture containing air into the chamber through the aperture 24. The large surface per unit volume of vapor in contact with the moisture causes the alkoxy groups of the silane coupler to hydrolyze even though such groups will not hydrolyze in neutral aqueous solutions. Of course, the elevated temperature maintained in chamber 16 further promotes the hydrolysis of the alkoxy silane. Hydrolysis of alkoxy silane has been confirmed by gas chromatography.

As a specific illustration, a single filament of glass was formed from a melt at a temperature of 2,525° F. having an orifice .080" in diameter. A .0004" diameter filament was formed at a forming rate of about 8,000 ft. per minute. The bushing orifice was enclosed in a glass tube extending downwardly into a vapor chamber such as shown in the drawing. From the orifice to the bottom of the chamber a total distance of 20" was provided, represented as $a$ plus $b$ in the drawing. A contact distance $a$ of about 14" gave a contact time of the glass in the vapor finish chamber 16 of about .0008 second. A number of filaments were produced using different atmospheric conditions, and coupling compositions. While the filaments tested were formed at 8,000 ft. per minute, it will be realized that the forming rate could be readily increased above this rate to achieve the commercial rate of 10,000 to 14,000 ft. per minute by increasing the length of the vapor chamber.

The glass filaments produced were wound on a mandrel to provide crowned hoops approximately ¼" thick in their center portion. In winding the glass filaments, a layer of cheesecloth was used on the mandrel, to provide channels for the resin to flow between the glass lay-up and the mandrel during the resin impregnation step. Aided by the application of a vacuum and the cheesecloth, thorough wetting of the filaments was accomplished using an epoxy resin mixture consisting essentially of 100 parts diglycidal ether of bisphenol A, 91 parts methyl Nadic anhydride, and 0.3% dimethyl benzyl amine catalyst. The glass content of the hoops was approximately 78–82% by weight. The resin impregnated hoop was then placed in an oven at 260° F. for 14 hours followed by 4 hours at 360° F. as post cure.

Hoops made as described above, were then ground to reduce the dimensions to .250" width and .059" to .063" thick and pieces were then tested, both before and after boiling in water for periods of 72 and 169 hours. The following table shows shear strength results comparing liquid coupler application (run #1) and vapor phase application in different atmospheric conditions (runs 2 and 3). The test specimens were tested in flexure at a span-to-depth ratio of 8 to 1 using three ¼" diameter bars set ½" apart. The test pieces were inserted so that the middle or loading bar rested on the impregnated cheesecloth side to put the resin layer under compression. Failure always occurred in interlaminar shear midway between the upper and lower faces.

| Specimen | Coupler Application | Atmospheric Conditions | Shear strength (p.s.i.×10³) | | |
|---|---|---|---|---|---|
| | | | Dry | After 72 hrs. Boil | After 169 hrs. Boil |
| 1 | Liquid | Air | 9.8 | 4.0 | 1.0 |
| 2 | Vapor | Air | 9.7 | 7.7 | 3.4 |
| 3 | Vapor | Dry N₂ | 10.1 | 8.8 | 4.5 |

The following tests were conducted using as the laminating resin 63.5 parts dicyclopentadiene dioxide mixed with the esterification product of 30.1 parts maleic anhydride and 6.7 parts trimethylolpropane:

| Specimen | Condition in Forming Chamber | Silane in Vapor Chamber | Shear strength (p.s.i.×10³) | |
|---|---|---|---|---|
| | | | Dry | After 12 hrs. Boil |
| 4 | CA+air+H₂O | MPS | 10.2 | 9.5 |
| 5 | N₂ | MPS | 12.5 | 11.0 |
| 6 | N₂ | GPS | 11.0 | 10.0 |
| 7 | CA+air+H₂O | VTES | 8.5 | 1.0 |
| 8 | CA+air+H₂O | APS | 10.0 | 8.0 |
| 9 | N₂ | APS | 12.5 | 10.5 |

CA—coupling agent.
MPS—methacryloxy propyl trimethoxy silane.
GPS—glycidoxy propyl trimethoxy silane.
VTES—vinyl triethoxy silane.
APS—amino propyl triethoxy silane.

Shear strength was calculated in accordance with the following formula:

$$\text{Horizontal Shear} = \frac{0.75P}{bd}$$

where:

$P$=breaking load in pounds,
$b$=width of specimen in inches and
$d$=thickness of specimen in inches These tests demonstrated not only the advantages of vapor phase application to nascent glass but also the importance of anhydrous atmospheric conditions, devoid of coupler in the forming chamber 36 prior to application of the coupler in the treatment chamber 16. Note that specimen #2 had strength retention after 169 hours in boiling water approximately 3½ times that of the specimen formed in air and 4½ times that of the specimen formed using an aqueous solvent to apply the coupler.

When a coupling agent such as an amino alkyl alkoxy silane $(C_2H_5O)_3Si-CH_2-CH_2-CH_2-NH_2$ is applied to the surface of the glass, in chamber 16, the coupling agent reacts with the moisture in the air to become hydrolyzed forming silanol groups Si—OH. These groups react with the glass surface and with each other.

In carrying out this invention, any suitable coupling agent may be used, such as various silanes having a resin reactive group such as an amino ($NH_2$) or glycidoxy group. Examples of such materials are glycidoxy propyl trimethoxy silane, and amino propyl triethoxy silane. These coupling agents may be employed where epoxy or phenolic resins are to be used in making glass resin laminates or composites. Coupling agents suitable for reaction with polyester resins may also be applied in their vapor phase to the surface of the glass. Such coupling agents are vinyl (trimethoxy ethoxy) silane, gamma trimethacryloxy propyl trimethoxy silane, and glycidoxy propyl trimethoxy silane.

It is to be understood that the examples of coupling agents listed above are given merely by way of illustration and are not to be considered in any way as limiting the scope of this invention.

Having thus described this invention what is claimed is:

1. Method of applying glass-resin coupling composition to glass comprising the steps of cooling a glass filament in its nascent state in an anhydrous essentially chemically inert atmosphere to reduce the glass below a predetermined temperature, and immediately thereafter contacting the filament with the vapor of an alkyl alkoxy silane glass-resin coupling agent combined with air containing moisture, to hydrolyze the coupling agent, said predetermined temperature being the thermal decomposition temperature of the coupling agent, and maintaining said coupling agent at its vaporization temperature.

2. Apparatus for applying glass-resin coupling composition to glass comprising a first chamber open at its upper and lower end, means for introducing an inert, anhydrous gas to said chamber, a second chamber communicating at its upper end with the lower end of said first chamber including means at its lower end for introducing the vapor of said coupling composition into the chamber, said second chamber having an aperture intermediate its upper and lower ends for the entry of air into the chamber, and means for controlling the temperature of said second chamber to approximately the vaporization temperature of said coupling composition.

References Cited by the Examiner

UNITED STATES PATENTS

| | | | |
|---|---|---|---|
| 2,699,415 | 1/1955 | Nachtman | 65—3 X |
| 2,767,519 | 10/1956 | Bjorksten | 65—3 |
| 2,954,582 | 10/1960 | Case | 65—11 |

DONALL H. SYLVESTER, *Primary Examiner.*

R. L. LINDSAY, *Assistant Examiner.*